United States Patent [19]

Bouwman et al.

[11] Patent Number: 5,223,470
[45] Date of Patent: Jun. 29, 1993

[54] SULFUR-PROMOTED NICKEL CATALYST AND PREPARATION THEREOF

[75] Inventors: Hermanus J. Bouwman, Huizen; Pieter J. W. Blom, Leusden, both of Netherlands

[73] Assignee: Engelhard De Meern B.V., Landjonker, Netherlands

[21] Appl. No.: 726,871

[22] Filed: Jul. 8, 1991

[30] Foreign Application Priority Data

Jul. 5, 1990 [NL] Netherlands .......................... 9001536

[51] Int. Cl.$^5$ .......................... B01J 21/04; B01J 23/74; B01J 27/043
[52] U.S. Cl. .................................................. 502/222
[58] Field of Search ......................................... 502/222

[56] References Cited

U.S. PATENT DOCUMENTS

| | | | |
|---|---|---|---|
| 3,856,831 | 12/1974 | Tateishi et al. | 260/409 |
| 4,118,342 | 10/1978 | Debus et al. | 502/222 |
| 4,169,843 | 10/1979 | Snyder | 502/222 |
| 4,201,718 | 5/1980 | Marsch | 260/409 |
| 4,317,748 | 3/1982 | Torok et al. | 252/472 |

FOREIGN PATENT DOCUMENTS

| | | |
|---|---|---|
| 0114704 | 8/1984 | European Pat. Off. . |
| 2168536 | 8/1973 | France . |
| 7300719 | 7/1973 | Netherlands . |
| 7201330 | 8/1973 | Netherlands . |

OTHER PUBLICATIONS

"Laboratory Handbook for Oil and Fat Analysis" by L. V. Cocks et al, Infra-red Quantitative Analysis of trans Content in Fatty Acids and Derivatives, Unilever Research Laboratorium, Vlaardingen, The Netherlands, pp. 389-391.

M. Arens and S. Koll, "Fette-Seifen-Anstrichmittel," 88, (1986), pp. 43-45.

*Primary Examiner*—W. J. Shine
*Attorney, Agent, or Firm*—Weingarten, Schuirgin, Gagnebin & Hayes

[57] ABSTRACT

The invention relates to a nickel on alumina catalyst which has been promoted with sulfur, having an atomic S/Ni ratio of between 0.06 and 0.10, an atomic Ni/Al ratio of between 2 and 10, and a particle size distribution, defined as $(d_{90-10})/d_{50}$, of between 0.4 and 1.5, $d_{50}$ ranging from 4 to 20 μm.

8 Claims, No Drawings

SULFUR-PROMOTED NICKEL CATALYST AND PREPARATION THEREOF

The present invention relates to a nickel on alumina catalyst which has been promoted with sulfur.

Such catalysts are well known, and are employed in particular for the selective hydrogenation of edible oils and fats. These triglycerides, often containing polyunsaturated fatty acids, are often hydrogenated prior to use, so as to increase stability and adjust the melting behaviour.

Increasing the stability of the polyunsaturated triglycerides is accomplished by hydrogenation of the readily oxidizable polyunsaturated bond. Oxidation of these bonds is undesirable, as this gives rise to a rancid taste.

Adjusting the melting behaviour of the product is particularly important with a view to rendering the product suitable for use in margarines, hard shortening and cocoa butter substitutes.

From U.S. Pat. No. 3,856,831 it is known to hydrogenate fats and oils with a nickel catalyst which has been partially poisoned with sulfur. Utilizing the process of that U.S. patent specification, hardened fats are obtained which are very suitable for use as cocoa butter substitutes. Cocoa butter has a very steep melting range at a temperature of 30°–35° C. The high price of cocoa butter, however, has led to a search for substitutes in the form of hydrogenated edible oils whose melting behaviour approximates that of cocoa butter.

During hydrogenation of polyunsaturated oils, side reactions occur, such as geometric and positional isomerization. The extent to which geometric isomerization occurs has a strong influence on the melting behaviour of the hydrogenated oil. The double bonds of naturally occurring triglyceride oils are almost exclusively present is the cis form. The geometric isomerization occurring simultaneously with the partial hydrogenation leads to the formation of trans-isomers. The melting points of cis and trans-isomers are clearly different. For glycerol trioleate, the melting points are 5° and 42° C., respectively. Accordingly, the eventual melting behaviour of triglycerides is partly determined by the triglyceride composition and the transisomer content obtained after hydrogenation.

To obtain a melting range as steep as possible and a good melting point, a maximum trans-isomer content is desirable. Furthermore, a minimum formation of completely saturated compounds is desirable because they have a melting point that is higher than that of the partially hydrogenated triglycerides.

In the selective hydrogenation it is accordingly attempted to achieve a maximum conversion of polyunsaturated triglycerides to monounsaturated triglycerides having a maximum trans-isomer content.

The extent to which geometric isomerization occurs depends, among other factors, on the reaction conditions employed. Reduction of the hydrogen concentration on the catalyst surface promotes the formation of trans-isomers. This reduction can for instance be obtained by using a high reaction temperature and a low hydrogen pressure. The choice of the type of catalyst can also influence the extent of formation of certain isomers.

Conventional nickel catalysts give rise only to a minor degree of geometric isomerization. The use of sulfur-containing nickel catalysts has a very positive influence on the formation of trans-isomers. As is also indicated in the aforementioned U.S. patent specification, such catalysts are sometimes referred to as poisoned with sulfur or promoted with sulfur. The point is that when sulfur is added to the catalysts, active sites that would normally be available for dissociation of hydrogen are irreversibly occupied by sulfur. This leads to a lower degree of hydrogen coverage, which yields an increased degree of isomerization, in addition to a lower hydrogenation activity.

In the literature, various processes have been described for applying sulfur to nickel catalysts. The process described in the aforementioned U.S. Pat. No. 3,856,831 comprises treating a reduced nickel catalyst with a mixture of hydrogen and hydrogen sulfide.

According to U.S. Pat. No. 4,118,342, mixtures of hydrogen and thiophenes or mercaptans are used.

Adding the sulfur compound can also be accomplished during the formation of the catalyst. According to Netherlands patent applications 7,300,719 and 7,201,330, use is made of flowers of sulfur and a sulfur-providing organic compound such as thioacetamide, respectively, during precipitation of the catalyst.

Although the catalysts described hereinabove generally combine a reasonable activity with a good selectivity towards trans-isomers, there is a need for an improved catalyst, because it has been found that the known catalysts, both initially and after repeated use, present problems as regards filterability. The hydrogenation of triglycerides most usually occurs in "slurry phase". This means that the catalyst is suspended in the liquid reaction mixture. After completion of the hydrogenation, the catalyst of the hydrogenated triglycerides must be separated by filtration. The degree of filterability of the catalyst is of great importance for the time required for the total treatment, so that good filterability, i.e. a short filtration time, is of great economical importance.

Accordingly, the invention provides a nickel on alumina catalyst which has been promoted with sulfur, having
an atomic S/Ni ratio of between 0.06 and 0.10,
an atomic Ni/Al ratio of between 2 and 10, and
a particle size distribution:
 ($d_{90-10}$)/$d_{50}$ of between 0.4 and 1.5, and
 $d_{50}$ of between 4 and 20 μm.

Surprisingly, it has been found that such a catalyst combines a particularly good activity and selectivity with eminent filtration behaviour.

The S/Ni ratio of the catalyst according to the invention is preferably from 0.07 to 0.09, while the Ni/Al ratio is between 4 and 8.

It is of essential importance for the catalyst according to the invention that alumina is used as the support material, while the particle size distribution and the average particle size are within the range specified. A distribution or average particle size that goes beyond these limits can lead to a deterioration of the catalyst properties.

Both initially, i.e. when used for the first time, and after repeated use, an alumina support leads to a considerably better filtration behaviour compared with the use of other supports, such as silica. In this connection it is observed that the use of silica-containing supports can be disadvantageous in view of attrition of the support, which leads to a strong deterioration of filterability.

The catalyst according to the invention can be prepared in various ways, but it is preferable to use a process comprising simultaneously injecting into water a solution of a nickel compound of pH≦6 and a solution of an aluminate of pH≧10, at a temperature of 70°–90° C., the suspension formed having a pH 7–9, under such conditions that a precursor of a nickel on alumina catalyst is formed, followed by separating the catalyst or precursor from the liquid, drying and optional calcination and/or activation, with a sulfur compound being applied to the catalyst during or after the formation referred to.

Using this process, a catalyst having an eminently defined particle size distribution and good catalytic activity can be obtained. This process further provides the possibility of obtaining a catalyst having a high nickel content.

Application of the sulfur compound is preferably accomplished using a water-soluble sulfur compound. More particularly, an aluminate solution is used which comprises such a sulfur compound in dissolved form. Suitable sulfur compounds are alkali metal sulfides such as sodium sulfide.

The preference for water-soluble sulfur compounds, and more particularly for sodium sulfide, is based on the ready application thereof, and the eminent reproducibility of the sulfur distribution obtained.

It is also possible, however, to use other sulfur compounds which are described in the prior art, such as flowers of sulfur, thioacetamide, thiophenes and mercaptans. It is also possible to use $H_2S$.

In the preparation of the catalysts, a solution of a nickel compound is used having a pH≦6, preferably between 4 and 6. Suitable nickel compounds are nickel chloride, nickel sulfate, and nickel nitrate.

In the preparation of the catalyst, an aluminate solution of high pH is used. Preferably, the starting material is sodium aluminate, although other aluminates can be used as well. The aluminum content in the solution is selected such that a proper nickel/alumina ratio in the catalyst is obtained. The catalyst composition is also partly determined by the volume amounts injected.

After completion of the injection of the two solutions into the water, the catalyst or the precursor therefor can be separated from the liquid. Generally, it is then dried, calcined and/or activated. In the case where the sulfur compound cannot be applied during the formation of the catalyst, at a later stage of the preparation the catalyst and/or precursor therefor can be contacted with a suitable sulfur source. However, it is preferable for the water-soluble sulfur compound to be added to the aluminate solution. The point is that in this way the optimum and most reproducible sulfur distribution is obtained.

In the preparation, the morphology of the catalyst can be influenced by the choice of the different variables, such as rate of stirring, temperature, injection rate and the like. These variables are known per se and the skilled worker can determine the appropriate conditions for the desired final result by means of simple tests.

The particle size distribution of the catalyst according to the invention, i.e. $(d_{90}-d_{10})/d_{50}$, is between 0.4 and 1.5, preferably between 0.4 and 1.2 and more particularly between 0.6 and 1.0. The average particle size will generally be between 4 and 20 $\mu$m, more particularly between 7 and 15 $\mu$m. The particle size is determined using Laser Diffraction, as explained in more detail in the Examples.

The invention will now be explained with reference to some examples, which should not be regarded as limiting the invention.

EXAMPLES

In the following examples, a number of test methods have been used. These methods are defined as follows.

Filtration test

An amount of catalyst corresponding to 0.2 wt. % nickel is suspended in 150 g soya bean oil of a temperature of 80° C. After standard pretreatment consisting of stirring for 5 minutes, the suspension is transferred to a filtration tube in which is arranged a paper filter of an area of 7 cm$^2$. The assembly is maintained at 80° C. The pressure is then raised to 2 bar, whereafter the weight of the filtered oil is determined as a function of time. The time that has lapsed between the increase of the pressure to 2 bar and the moment when 120 g oil has been filtered, is used for calculating the filtration time, which is defined as the difference in time with and without catalyst in the oil.

In the Examples, also the filterability was determined after special pretreatment. This means that the catalyst was vibrated by ultrasound for 5 minutes prior to measurement. The difference between the standard value and the value after pretreatment is a measure for the attrition susceptibility of the catalyst.

Activity

The activity of a catalyst is determined by hydrogenating 500 g soya bean oil having an iodine value of 130 at 200° C. at a hydrogen pressure of 0.7 bar with an amount of catalyst corresponding to 0.15 wt. % nickel. The decrease of the refraction index after 30 minutes reaction time is determined with a Zeiss refractometer, and compared with the decrease obtained with a standard catalyst under the same conditions. The decrease of the refraction index is proportional to the iodine value decrease. The activity is now expressed as the ratio between the iodine value decreases (in %) calculated from the refraction indices. Another method for determining the activity is the time (in minutes) elapsing until an iodine value of 80 has been achieved.

Selectivity

The selectivity of a catalyst is determined by analyses on soya bean oil which has been hydrogenated to an iodine value of 80.

In the first place, the trans-isomer content is determined utilizing the method of L. V. Cocks and C. van Rede, "Laboratory handbook for oil and fat analysis", Academic Press, London 1966. In the second place, the solid fat content (SFC) at different temperatures is determined by means of NMR using the method of M. Arens and S. Kroll, Fette-Seifen-Anstrichmittel, 88 (1986), pp. 43–45.

Particle size distribution

The $d_{10}$, $d_{50}$, and $d_{90}$ of the catalysts are determined by means of a laser diffraction particle sizer (Malvern, Master Particle Sizer 2600C, lens 63 mm, which corresponds to a measuring range of 1.2–118 $\mu$m; the model for calculating the particle size was Independent). The values referred to indicate the percentage by volume of the particles of smaller diameter than the value specified. Thus, $d_{10}$ indicates that 10% by volume of the particles has a diameter smaller than the value of the $d_{10}$. A good measure for the particle size spread of the catalyst is the $(d_{90}-d_{10})/d_{50}$. As the particle size does not change as a result of the reduction of the catalyst, measurements were invariably carried out on the non-reduced catalyst. Prior to measurement, the catalyst is first "unclustered" by ultrasound vibration of a suspension of the catalyst in a solution of pyrophosphate (1.35 g/l) for 5 minutes.

EXAMPLE 1

800 ml of a solution of nickel chloride in water (100 g nickel per liter) and 800 ml of a solution of sodium aluminate (33 g per liter), sodium sulfide (18 g per liter) and sodium carbonate (200 g per liter) were simultaneously and at the same rate pumped into a well-stirred 4-liter precipitation vessel at a temperature of 80° C. The pH of the slurry formed was 7.8 and after about 1 hour the precipitation was completed.

After washing of the precipitate with approx. 30 liter water, the precursor of the catalyst formed was filtered and dried in an oven at 110° C. The catalyst was activated at 400° C. with hydrogen. The composition of the catalyst is specified in Table 1.

EXAMPLE 2

In the same manner as described in Example 1, a catalyst was prepared, wherein a different Ni/Al ratio was used. The composition of the catalyst is specified in Table 1.

The properties of the catalysts according to Examples 1 and 2 were determined in the manner described hereinabove. These properties are also included in Table 1.

COMPARATIVE EXAMPLES A AND B

Two catalysts which did not meet the requirements of the invention were examined. Catalyst A with silica as support exhibits a high attrition susceptibility. Catalyst B, a commercially available sulfur-promoted nickel on silica/alumina catalyst, moreover exhibits too broad a particle size distribution and hence unsatisfactory filtration times. The properties of these catalysts are summarized in Table 1.

TABLE 1

| Example | 1 | 2 | A | B |
|---|---|---|---|---|
| Ni/Al mole ratio | 5 | 8 | — | 7 |
| S/Ni mole ratio | 0.08 | 0.08 | 0.12 | 0.08 |
| Ni/Si mole ratio | — | — | 6 | 6 |
| $d_{10}$ (μm) | 9.1 | 7.1 | 5.3 | 2.5 |
| $d_{50}$ (μm) | 12.4 | 13.1 | 9.7 | 7.8 |
| $d_{90}$ (μm) | 17.4 | 19.9 | 15.2 | 19.5 |
| $(d_{90}-d_{10})/d_{50}$ | 0.67 | 0.98 | 1.02 | 2.18 |
| Filtration time | | | | |
| Standard (min) | 0.6 | 0.8 | 1.5 | 10.9 |
| Ultrasound (min) | 0.8 | 1.0 | 2.6 | 49.2 |
| Activity (%) | 133 | 117 | 165 | 100 |
| Time to IV 80 (min) | 40 | 54 | 46 | 86 |
| % trans | 69.9 | 72.3 | 70.7 | 70.0 |
| SFC (%) | | | | |
| 10° C. | 70.5 | 69.8 | 72.3 | 69.4 |
| 20° C. | 43.8 | 41.7 | 46.8 | 44.1 |
| 25° C. | 29.4 | 26.4 | 34.1 | 30.4 |
| 30° C. | 13.1 | 9.0 | 17.8 | 14.5 |
| 35° C. | 1.6 | 0.2 | 4.5 | 2.3 |
| 40° C. | 0 | 0 | 1.7 | 0.2 |

TABLE 1-continued

| Example | 1 | 2 | A | B |
|---|---|---|---|---|
| 45° C. | 0 | 0 | 0.1 | 0.1 |

EXAMPLES 3 AND 4

In the manner as described in Example 1, two catalysts were prepared with different sulfur contents. The results are shown in Table 2, which also shows the results of Example 1 for comparison.

TABLE 2

| Example | 1 | 3 | 4 |
|---|---|---|---|
| Ni/Al mole ratio | 5 | 5 | 5 |
| S/Ni mole ratio | 0.08 | 0.07 | 0.09 |
| $d_{10}$ (μm) | 9.1 | 8.8 | 8.9 |
| $d_{50}$ (μm) | 12.4 | 13.2 | 13.6 |
| $d_{90}$ (μm) | 17.4 | 20.2 | 21.2 |
| $(d_{90}-d_{10})/d_{50}$ | 0.67 | 0.86 | 0.90 |
| Filtration time | | | |
| Standard (min) | 0.6 | 0.7 | 0.7 |
| Activity (%) | 133 | 155 | 107 |
| Time to IV 80 (min) | 40 | 25 | 60 |
| % trans | 69.9 | 68.7 | 71.6 |
| SFC (%) | | | |
| 10° C. | 70.5 | 66.6 | 70.8 |
| 20° C. | 43.8 | 41.0 | 45.4 |
| 25° C. | 29.4 | 27.4 | 30.9 |
| 30° C. | 13.1 | 12.3 | 14.7 |
| 35° C. | 1.6 | 1.4 | 1.8 |
| 40° C. | 0 | 0.2 | 0.3 |
| 45° C. | 0 | 0.2 | 0.2 |

We claim:

1. A nickel on alumina catalyst which has been promoted with sulfur, having:
    an atomic S/Ni ratio of between 0.06 and 0.10,
    an atomic Ni/Al ratio of between 2 and 10, and
    a particle size distribution:
    $(d_{90}-d_{10})/d_{50}$ of between 0.4 and 1.5, and
    $d_{50}$ of between 4 and 20 μm.

2. A catalyst according to claim 1, characterized by an atomic Ni/Al ratio of between 4 and 8.

3. A catalyst according to claim 1, characterized by a particle size distribution:
    $(d_{90}-d_{10})/d_{50}$ of between 0.4 and 1.2, and
    $d_{50}$ of between 7 and 15 μm.

4. A process for preparing a nickel on alumina catalyst according to claim 1, comprising simultaneously injecting into water a solution of a nickel compound of pH≦6 and a solution of an aluminate of pH≧10, at a temperature of 70°–90° C., the suspension formed having a pH 7–9, under such conditions that a precursor of a nickel on alumina catalyst is formed, followed by separating the catalyst or precursor from the liquid, drying and optional calcination and/or activation, with a sulfur compound being applied to the catalyst during or after said formation.

5. A process according to claim 4, characterized in that the aluminate solution also contains a sulfur compound in dissolved form.

6. A process according to claim 5, characterized by using an alkali metal sulfide as the sulfur compound.

7. A nickel on alumina catalyst obtainable using the process according to claim 4.

8. The catalyst according to claim 3, further characterized by a particle size distribution:
    $(d_{90}-d_{10})/d_{50}$ of between 0.6 and 1.0 and
    $d_{50}$ of between 7 and 15 μm.

* * * * *